Patented Sept. 9, 1947

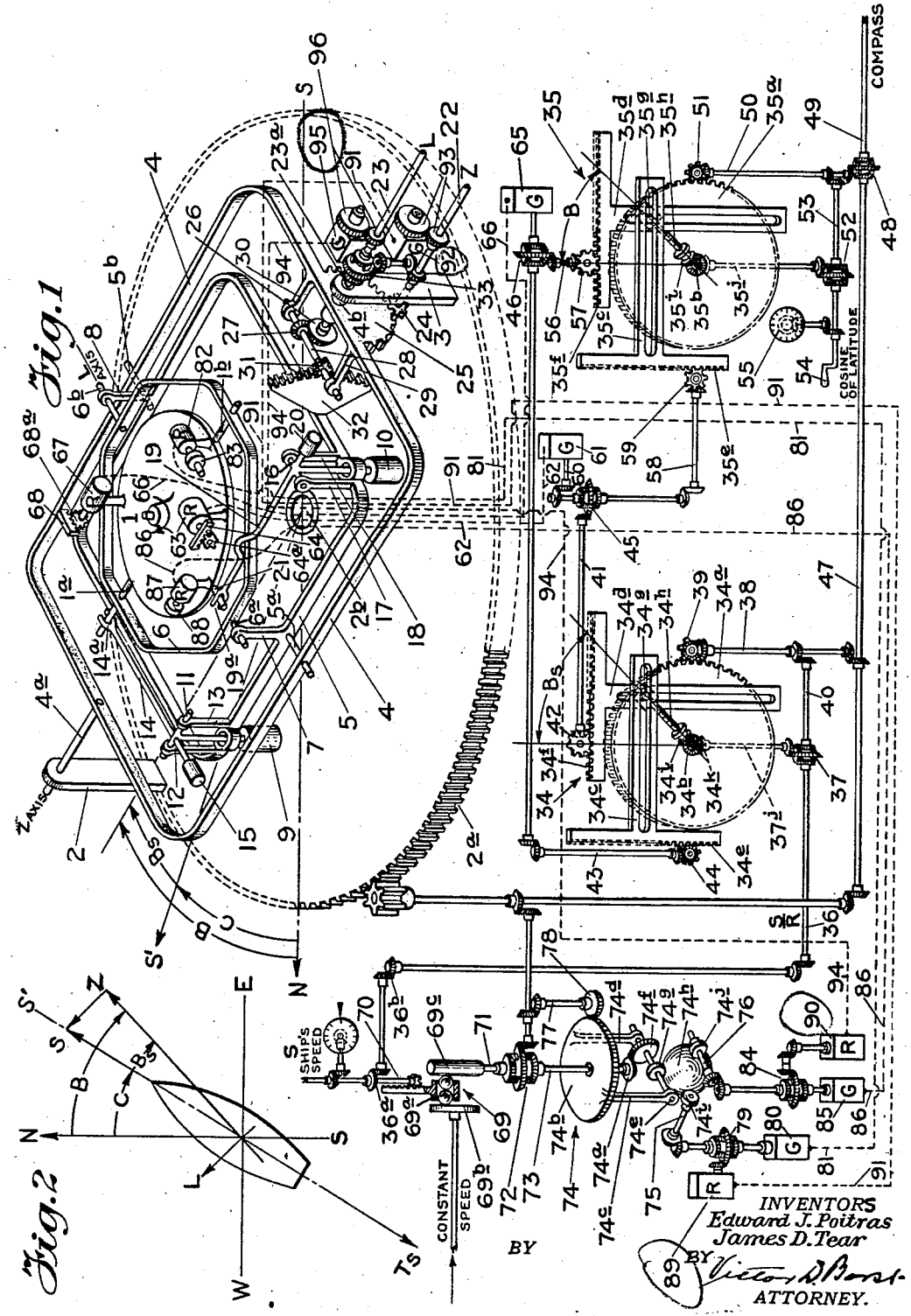

2,427,158

UNITED STATES PATENT OFFICE 2,427,158

VERTICAL-SEEKING GYRO

Edward J. Poitras, Little Neck, and James D. Tear, Great Neck, N. Y., assignors to Ford Instrument Company, Inc., Long Island City, N. Y., a corporation of New York Application September 27, 1937, Serial No. 165,934

14 Claims. (Cl. 74—5)

The invention herein disclosed relates to a gyroscopic mechanism and includes certain constructional features that are generally useful in conjunction with such mechanism. In particular, the invention relates to a fully compensated, vertical-seeking or level gyroscopic mechanism that is suitable for providing a reference for the true vertical and horizontal, for establishing an artificial horizon on a ship, for stabilizing an element on a ship and for providing a datum for measuring the angular roll and pitch of a ship.

It is a well known fact that a freely mounted, perfectly balanced, or neutral gyroscope remains stationary in space; that is, its spin axis remains parallel with its original position as the gyroscope support is moved in space by the rotation of the earth or the combined movement of the earth and a vehicle upon which the gyroscope may be mounted. In order to provide a vertical-seeking or level gyroscope, that will remain with its spin axis vertical at all times, it is therefore necessary to apply compensating precessional torques to the gyroscope to compensate for the earth's rotation; and in addition, when the gyroscope is mounted upon a ship, for example, it is necessary to apply compensating precessional forces to the gyroscope to offset the effect of change of latitude and longitude of the ship. Due to small unbalances and friction which are unavoidable in gyroscopes, a gyroscope so compensated will gradually deviate from the true vertical after having been started there. The deviation of the gyroscope from true vertical can be found by comparing the gyroscope vertical with the vertical obtained from a pendulum, provided the pendulum is not caused to depart from the true vertical by accelerations.

In the copending application of Hannibal C. Ford, filed July 7, 1937, Serial No. 152,357, for Level gyro, there is disclosed and described a fully compensated vertical-seeking or level gyroscope of this type. In that gyroscopic mechanism two pendulums having mutually perpendicular axes are provided to serve as references for the true vertical. In order to prevent the pendulums from departing from the true vertical and assuming the effective vertical when the pendulums are subjected to accelerations, the acceleration forces are continuously computed, generated and applied hydraulically to the pendulums to compensate for the forces imposed on the pendulums by these accelerations. Torques are applied hydraulically to the gyroscope to precess it to agree with the pendulums as deviations occur.

An object of the present invention is to simplify the construction of such gyroscopic mechanisms and to render them more reliable and accurate in operation. This and other objects of the invention, which will hereinafter appear, are realized by utilizing certain mechanical arrangements for computing, generating and applying precessional forces to the gyroscope to effect precession of the gyroscope and to compensate for the forces imposed on the pendulums due to accelerations.

A gyroscopic mechanism embodying the invention is shown diagrammatically in Figure 1 of the accompanying drawing, and Figure 2 of the drawing is a diagram of a ship on which the gyroscope may be mounted and illustrates the angular quantities that are utilized in the gyroscopic mechanism.

In the drawing, the gyroscope 1 is mounted in a gimbal system that is supported by spaced standards 2 and 3, which are mounted upon a platform 2a that is rotatable about an axis 2b perpendicular to the deck of the ship. The gimbal system includes a frame 4, having trunnions 4a and 4b extending from opposite sides thereof and journaled respectively in the standards 2 and 3; a phantom ring 5 within the frame 4 having trunnions 5a and 5b extending from opposite sides thereof and journaled in the sides of the frame, the axis of the trunnions 5a and 5b being at right angles to the axis of the trunnions 4a and 4b; and a gimbal ring 6. The gimbal ring 6 has trunnions 6a and 6b extending from opposite sides thereof and journaled in standards 7 and 8 extending from the phantom ring 5. The axis of the trunnions of the gimbal ring 6 is parallel to the axis of the trunnions of the phantom ring. Within the gimbal ring, the gyroscope 1 is mounted and it is supported by trunnions 1a and 1b extending from diametrically opposite points of the case of the gyroscope and journaled in the gimbal ring. The axis of the gyroscope trunnions is substantially parallel to the axis of the trunnions 4a and 4b, designated as the Z axis, when the parts are in normal position, and the axis of the gimbal ring is at right angles to the Z axis and it is designated as the L axis.

The gravitational control for providing vertical-seeking precessional forces on the gyroscope consists of two pendulums 9 and 10. The pendulum 9 is suspended from a pin 11 rotatably mounted in upstanding brackets 12 and 13 secured to one side of the phantom ring 5. Also secured to the pin 11, is an arm 14 having a bifurcated end 14a that receives the trunnion 1a extending from the gyroscope; a counterweight 15 balances the weight of the arm 14. The pendulum 10 is similarly suspended from a pin 16 that extends between and is journaled in upstanding brackets 17 and 18 secured to the phantom ring, the brackets 17 and 18 being secured to a side of the phantom ring adjacent the side to which the brackets 12 and 13 are secured. An arm 19, balanced by a counterweight 20, extends from the pin 16 and a bifurcated end 19a receives a pin 21 extending from the gyroscope in the plane through axis 6a perpendicular to axis 1a. It will be seen that when the pendulum 9 is moved from the true vertical a precessing force proportional to its displacement is exerted through the arm 14 on the trunnion 1a. This force is such as to cause the gyroscope to precess about the Z axis (known as the cross level axis), or the axis of the trunnions 1a—1b. The direction of rotation of the gyroscope is made such as to cause the precession to be in the direction to return the pendulum to the true vertical. Similarly, a precessional force is exerted to effect precession of the gyroscope about the L axis when the pendulum 10 is displaced from the true vertical.

When the spin axis of the gyroscope is vertical no force is applied by the pendulums as these are also vertical because the phantom ring is stabilized in space. The phantom ring is stabilized through follow-up mechanism (not shown) which causes the phantom ring to follow the angular movements of the gyroscope relative to its support. The follow-up mechanism used may be of any suitable type, many of which are well known to those skilled in the art, a suitable form being shown, for example, in United States Patent No. 1,937,336. Such follow-up mechanism may include two motors, one of which is driven in accordance with relative movement of the gyroscope and its support about the Z axis and the other of which is driven in accordance with relative movement of the gyroscope and its support about the L axis. The first drives a shaft 22 and the second a shaft 23. The shaft 22 extends through and is journaled in the standard 3. A gear 24 on the end of the shaft 22 meshes with a sector gear 25 secured to the frame 4 and which upon rotation effects movement of the frame about its trunnion axis. Such movement of the frame is transmitted to the phantom ring through the trunnions 5a and 5b. The shaft 23a extends through and is journaled in the trunnion 4b. On the end of the shaft 23a there is a bevel gear 26 which meshes with a bevel gear 27 mounted on a shaft 28. The shaft 28 is journaled in bearing brackets 29 and 30 extending from the frame and carries a gear 31 that meshes with a segment gear 32 secured to the phantom ring 5. Through this gear train rotation of the shaft 23 effects movement of the phantom ring about the axis of its trunnions 5a—5b. The shafts 22 and 23 are connected together through a differential 33 so that rotation of the frame by the shaft 22 does not affect movement of the phantom ring about its trunnion axis. In this way the phantom ring and the gyroscope move as a unit relative to the support.

A freely mounted, balanced gyroscope departs from the true vertical at an angular rate proportional to the speed of the ship on which the gyroscope is mounted and the angular velocity of rotation of the earth multiplied by the cosine of the latitude of position. Such departure from the true vertical must, of course, take place about the precessional axes of the gyroscope, the L and Z axes. In Figure 2 of the drawing, there is illustrated a typical condition of a ship on which a gyroscopic mechanism as herein described may be mounted. In this diagram, the north-south, east-west lines are designated in the usual manner, namely, N—S and E—W. The fore and aft line of the ship is represented by the line S' and the precessional axes of the gyroscope by the lines L and Z. The conditions represented show the ship to be traveling north-east by north, its compass course being indicated by the angle C. The platform upon which the gyroscopic mechanism is mounted is rotated such that the Z axis has a bearing Bs relative to the bearing of the ship. The true bearing of the Z axis of the gyroscope is B, the sum of the angles C and Bs.

The conditions which cause a gyroscope, such as that described, to indicate other than the true vertical may be said to be those conditions that effect changes in the vertical itself, that is, the vertical considered as the perpendicular to a horizontal plane at the particular location of the gyroscope. These include the factors resulting from the rotation of the earth, changes in the ship's latitude and longitude and the ship's maneuvers.

The magnitude of the errors introduced by the transient lateral accelerations are in direct proportion to the amount of gravity control used, while the magnitude of the steady state errors resulting from the rotation of the earth and changes in ship's longitude and latitude are in inverse proportion to the amount of gravity control used. A convenient way to define the amount of gravity control is to state the time required for a given angular departure from the vertical to be reduced to half value. This half value time may be determined as follows: Let the axis 1a—1b be accurately leveled and the axes 6a—6b and 5a—5b be inclined to the horizontal by an angle "a." The pendulum 9 held at an angle "a" to the vertical exerts a torque about axis 6a—6b equal to $wl \sin a$, where $w$ is the weight of the pendulum 9 and $l$ is the effective lever arm, taking into account the distance of the center of gravity of the pendulum 9 from the axis 11, the length of arm 14 and the distance of 14a from the axis 6a—6b. If "c" is the calibration constant of the gyroscope, that is, the precession rate corresponding to unit applied torque, the rate of recovery of the vertical by the gyroscope is (1) $$\frac{da}{dt} = -cwl \sin a$$

When the angle $a$ is small, such that $\sin a = a$ approximately, the rate of recovery is (2) $$\frac{da}{dt} = -cwla$$

Integrating (2) we have, (3) $\quad \log_e a = \log_e a_0 + \log_e e^{-cwlt}$ (4) $\quad \log_e a = \log_e a_0 - cwlt$ (5) $\quad \log_e a - \log_e a_0 = -cwlt$ (6) $$\log_e \frac{a}{a_0} = -cwlt$$

in which $a_0$ is the value of the given angular departure from the vertical, and $a$ is ½ of $a_0$, and $t$ is the time for the given angular departure from the vertical to be reduced to half value.

$$(7) \quad \log_e \frac{1}{2} = -cwlt$$

$$(8) \quad -\log_e 2 = -cwlt$$

$$(9) \quad t = \frac{\log_e 2}{cwl}$$

Since the effective movements of pendulums 9 and 10 are made equal, these considerations likewise apply to initial deflections from the vertical of the pendulum 10.

If the ship as illustrated in Figure 2 of the drawings is traveling at a speed "S," a freely mounted, balanced gyroscope positioned with respect to the ship as indicated in the drawing will depart from the vertical by virtue of the ship's speed at an angular rate of $$\frac{S}{R}$$

in which R is the radius of the earth. The component of this rate about the Z axis is $$(10) \quad \frac{S}{R} \sin B_s$$

and about the L axis, $$(11) \quad -\frac{S}{R} \cos B_s$$

Likewise, the angular rate of movement of the gyroscope from the true vertical about the L axis due to the angular velocity of the earth's rotation, E, is $$(12) \quad -E \cos \phi \cdot \sin B$$

in which $\phi$ represents the latitude of the ship, and about the Z axis is $$(13) \quad -E \cos \phi \cdot \cos B$$

The total rate of angular movement of the gyroscope from the true vertical due to the combined effect of the speed of the ship and the rotation of the earth is, about the Z axis, the algebraic sum of (6) and (9) above, or $$(14) \quad \frac{S}{R} \sin B_s - E \cos \phi \cdot \cos B$$

and about the L axis, it is the algebraic sum of (11) and (12) above, or $$(15) \quad -\frac{S}{R} \cos B_s - E \cos \phi \cdot \sin B$$

These quantities are continuously generated by two component solvers designated generaly by the numerals 34 and 35. These component solvers are of a type well known in the art, and are shown for example in Ford Patent No. 1,450,585. The component solver 34 includes a rotatably mounted, circular plate 34a having a gear on its outer edge and a bevel gear 34b rotatably mounted at its center. Two slotted T-shaped bars 34c and 34d are mounted above the plate and maintained at right angles to each other as indicated but slidable transversely. The bar 34c has a rack 34e on its outer edge and the bar 34d has a similar rack 34f on its outer edge. A pin 34g extends through the slots of both bars at their intersection and the pin is mounted upon a nut threaded on to a screw shaft 34h extending radially of the plate 34a. The screw shaft 34h carries a bevel gear 34i that meshes with the bevel gear 34b and it is rotated through this gear to effect radial movement of the pin 34g. A shaft 34j having a bevel gear 34k on the end thereof meshes with and drives the bevel gear 34b. While the pin 34g is free to move radially of the plate 34a it is constrained to partake of the rotational movement of the plate. The component solver 35 is identical with the component solver 34 and the parts thereof are designated by similar letters following the numeral 35.

The component solver 34 computes the factors $$\frac{S}{R} \sin B_s \quad \text{and} \quad \frac{S}{R} \cos B_s$$

For this purpose, the ship's speed, taken from the ship's log and modified by the gears 36a and 36b to give $$\frac{S}{R}$$

is introduced through a shaft 36 to a differential 37 to which the shaft 34j is connected and through which it is driven. The differential 37 is provided for the purpose of preventing movement of shaft 34h due to movement of the plate 34a which is rotated in accordance with the angle $B_s$. The angle $B_s$ is obtained from the rotation of the platform on which the gyroscope is mounted which platform drives a shaft 38 and a pinion 39 driven thereby that meshes with the gear on the edge of the plate 34a. The shaft 38 is connected to the differential 37 through a shaft 40. Thus connected, the pin 34g is moved radially in accordance with the speed of the ship and positioned angularly in accordance with the angle $B_s$ thus setting up a vector which is resolved by the bars 34c and 34d into its components $$\frac{S}{R} \sin B_s \quad \text{and} \quad \frac{S}{R} \cos B_s$$

the bar 34d being moved transversely in proportion to $$\frac{S}{R} \sin B_s$$

and the bar 34c being moved transversely in proportion to $$\frac{S}{R} \cos B_s$$

The movement of the bar 34d is transmitted to a shaft 41 through a gear 42 and meshing with the rack 34f. Movement of the bar 34c effects movement of a shaft 43 through a gear meshing with the rack 34e. The shaft 41 is connected to a differential 45 and the shaft 43 is connected to a differential 46.

The component solver 35 computes the factors $E \cos \phi \cdot \sin B$ and $E \cos \phi \cdot \cos B$. In this case, a shaft 47, connected with a differential 48, is rotated in accordance with the angle $B_s$. Another shaft 49 connected to the differential 48 is rotated in accordance with the angle C, which is obtained from the ship's compass. The output of the differential represented by the rotation of a shaft 50 is therefore the algebraic sum of the angles $B_s$ and C or the angle B. The shaft 50 is connected to the plate 35a through a gear 51 meshing with the gear on the edge of the plate 35a and the plate 35a is thus rotated in accordance with the angle B. The shaft 35j is connected to a differential 52 which is connected by a shaft 53 to the shaft 50. The angular quantity $\cos \phi$ is introduced to the differential 52 manually by a crank 54 which is rotated until a dial 55 indicates the latitude at which the ship is located, the graduations on the dial 55 being such that the dial reading indicates the angle in degrees the cosine value of which is introduced by the crank 54. The quantity E is a constant and the rotation of the crank 54 modifies this quantity through proper gear ratio so that the shaft 35h is rotated to set the pin 35g in accordance with $E \cos \phi$, which represents the component of angular velocity of the earth perpendicular to the true vertical at latitude $\phi$. The movement of the rack 35f is, therefore, proportional to the quantity $E \cos \phi \cdot \sin B$ and the movement of the rack 35e is proportional to the quantity $E \cos \phi \cdot \cos B$. Movement of the rack 35f is transmitted through a shaft 56, and a gear 57 meshing with the rack 35f, to the differential 46, and movement of the rack 35e is transmitted to the differential 45 through a shaft 58 and a gear 59 meshing with the rack 35e.

The output of the differential 45, represented by a shaft 60 connected to the rotor of a synchro generator 61, is thus the angular quantity representing the algebraic sum of the movements of the racks 34f and 35e or the quantity $$E \cos \phi \cos B - \frac{S}{R} \sin B_s$$

The synchro generator 61 is electrically connected, as indicated by the broken line 62, to a small synchro motor 63 mounted on the case of the gyroscope. The shaft of the rotor of the synchro motor 63 carries a gear 64a which meshes with the rack 64. The rotor of the synchro motor repeats the angular movement of the synchro generator and the center of gravity of the rack 64 is thus displaced by an amount proportional to $$E \cos \phi \cos B - \frac{S}{R} \sin B_s$$

and the unbalanced torque exerted by the displaced rack is proportional to this quantity. The torque exerted by the displaced rack acts on the gyroscope to effect movement of the gyroscope about the Z axis, thus compensating for the movement of the ship and the earth's rotation with respect to this axis.

Similarly, the output of the differential 46 rotates the rotor of a synchro generator 65 in accordance with the quantity $$E \cos \phi \sin B + \frac{S}{R} \cos B_s$$

The generator 65 is electrically connected as indicated by the broken line 66, with a synchro motor 67 mounted on the gyroscope the rotor of which is connected to a rack 68, through a pinion 68a on the shaft thereof. The displacement of the center of gravity of the rack 68 applies a torque effective to cause precession of the gyroscope about the L axis proportional to the speed of the ship and the earth's rotation with respect to the L axis.

In addition to the foregoing compensating torques, torques to compensate for the effects on the pendulums 9 and 10 due to changes in the ship's course and speed must be generated and applied to the gyroscope. A change in ship's speed S, the course angle being constant, affects the pendulum 10 to produce a torque about the Z axis equal to $$-wl\frac{dS}{dt} \cos B_s$$

and affects the pendulum 9 to produce a torque about the L axis equal to $$-wl\frac{dS}{dt} \sin B_s$$

The resultant of these torques may be represented by a vector $T_s$ of the magnitude of $$wl\frac{dS}{dt}$$

in the direction of minus S, or opposite to S.

A rate of change of ship's course C, the speed being constant, affects the pendulum 10 to produce a torque about the Z axis of the gyroscope equal to $$-wlS\frac{dC}{dt} \sin B_s$$

and affects the pendulum 9 to produce a torque about the L axis equal to $$+wlS\frac{dC}{dt} \cos B_s$$

The resultant torque $T_c$ may be represented by a vector of magnitude $$wlS\frac{dC}{dt}$$

directed to port.

For the purpose of generating compensating torques for these torques produced by the pendulums 9 and 10 upon changes in the speed and course of the ship upon which the gyroscope is mounted and thus prevent precession of the gyroscope from the true vertical there is provided the compensating mechanism illustrated at the left of Fig. 1. This mechanism includes an ordinary two ball integrator 69 in which the speed of the ship S, delivered through a shaft 70, connected to the shaft 36, is used to move the ball carriage 69a of the integrator. The plate 69b of the two ball integrator is driven at a constant speed representing time and the roller 69c is thus driven in proportion to $\int S dt$, or the movement of the ship. The roller 69c is connected by a shaft 71 to a differential 72 and through the differential by a shaft 73 to the driving gear 74a of a single ball integrator and component solver 74 of a type well known in the art.

The single ball combined integrator and component solver 72 includes a rotatably mounted plate 74b which carries two bearing brackets 74c and 74d. A shaft 74e is journaled in these bearing brackets and has secured thereon a gear 74f which meshes with the gear 74a and a driving wheel 74g that engages and drives a ball 74h. Two driven wheels 74i and 74j mounted on shafts 75 and 76 engage the ball 74h at points ninety degrees apart. The plate 74b is rotated, through a shaft 77 carrying a gear 78 that meshes with a gear formed on the edge of the plate, in accordance with the angle $B_s$. The shaft 78 is also connected to the differential 72 to offset the effect of rotation of the plate 74b on the ball 74h. It will be seen from this arrangement that the driven wheel 74i is driven in proportion to $\int S dt \sin B_s$ or the component of the movement of the ship parallel to the L axis of the gyroscope and the driven wheel 74j is rotated in proportion to $\int S dt \cos B_s$ or the component of the movement of the ship parallel to the Z axis of the gyroscope. The shaft 75 drives, through a differential 79, a synchro generator 80. This synchro generator is electrically connected, as indicated by the broken line 81 to a synchro motor 82 mounted on the gyroscope and which drives an inertia element or fly-wheel 83. Similarly, the shaft 76 is connected through a differential 84 to a synchro generator 85. This synchro generator is electrically connected, as indicated by the broken line 86 to a synchro motor 87 mounted on the gyroscope and which drives a fly-wheel 88.

The shaft 75 is driven in accordance with the quantity $$-\frac{wl}{I} \sin B_s \int_{t_0}^{t} S dt$$

and the shaft 76 is driven in accordance with the quantity $$-\frac{wl}{I} \cos B_s \int_{t_0}^{t} S dt$$

in which $I$ represents the moment of inertia of the rotating system, i. e., the fly-wheel 83 and the synchro rotor and the fly-wheel 88 and its synchro rotor, and $t_0$ represents the initial time which may have any arbitrary value. At a particular time, therefore, the angular momentum of the fly-wheel 83 is $-wlS \sin B_s$, and the angular momentum of the fly-wheel 88 is $-wlS \cos B_s$. The resultant angular momentum may be represented by a vector of the magnitude $wlS$ in the direction of minus S. Any change in the magnitude and direction of the ship's speed thus effects a proportional change in the resultant angular momentum of the fly-wheels 83 and 88. The components of torque produced by this change are transmitted by reaction upon the gyroscope 1. A change in ship's speed S, course angle constant, produces a torque on the gyroscope 1 equal to $$-\frac{d(-wlS)}{dt}, \text{ or } wl\frac{dS}{dt}$$

which compensates the torque $T_s$ due to the pendulums 9 and 10. A change of course angle C, speed S and relative bearing $B_s$ remaining constant, produces a gyroscopic reaction on the gyroscope 1 equal to $$wlS\frac{dC}{dt}$$

equal but opposite to the torque $T_c$ due to the pendulums 9 and 10. A change of course angle C, speed S and true bearing B remaining constant, will require a change of relative bearing $B_s$ equal and opposite to the change in course angle C. Under this condition there will be no true angular change in the gyroscope support itself but the change of $B_s$ introduced into the component integrator 74 will result in changes in the angular momentum of the fly-wheels 83 and 88, with a corresponding reaction on the gyroscope 1 equal and opposite to the torques due to the pendulums 9 and 10.

If the gyroscopic mechanism is mounted above or below the metacenter of the ship, the effect on the pendulums of acceleration due to roll and pitch must be neutralized. The effects of roll and pitch are necessarily alternating in character and therefore, in time, integrate to zero. Since the half value time of the gyroscope is large compared to the periods of roll and pitch, the momentary roll and pitch errors never become large. It is therefore possible to use certain approximations and thus simplify the computing mechanism. In the mechanism illustrated, the following approximations are used. The horizontal component of velocity of the pendulum 9 due to an angular velocity about the Z axis is taken as $$h\frac{dZ}{dt}$$

in which $h$ is the height of the pendulum 9 above the metacenter; the torque about the L axis generated by the pendulum 9 by virtue of an acceleration about the Z axis is taken as $$wlh\frac{d^2Z}{dt^2}$$

and the torque about the Z axis due to acceleration of the pendulum 10 about the L axis is taken as $$-wlh\frac{d^2L}{dt^2}$$

The maximum errors introduced by using these approximations are proportional to $1-\cos Z$, and $1-\cos L$ respectively and in practice never exceed a small fraction of one minute of angle.

In the compensating mechanism the value $$\frac{wlhZ}{I}$$

is added to the angular position of the fly-wheel 83, by being introduced in the differential 79, and the value $$\frac{-wlhL}{I}$$

is added to the angular position of the fly-wheel 88 by being introduced in the differential 84. These values are introduced into differentials 79 and 83 by synchromotors 89 and 90 respectively. Synchromotor 89 is connected, by an electrical connection, as indicated by the broken line 91 to a synchrogenerator 92 which is connected by the spur gears 93 to shaft 22 and rotated thereby in accordance with the value Z. Synchromotor 90 is connected, by an electrical connection, as indicated by the broken line 94, to a synchrogenerator 95 which is connected by the spur gears 96 to shaft 23 and rotated thereby in accordance with the value L. An acceleration about the Z axis is thus accompanied by a proportional acceleration of the fly-wheel 83 and a reaction torque upon the frame 6 equal to $$-wlh\frac{d^2Z}{dt^2}$$

which compensates the corresponding torque due to the pendulum 9. Likewise, an acceleration about the L axis is accompanied by an acceleration of the fly-wheel 88 and a torque upon the gyroscope 1 equal to $$wlh\frac{d^2L}{dt^2}$$

which compensates the corresponding torque due to the pendulum 10.

From the foregoing description of the gyroscopic mechanism illustrated in the drawings it will be seen that there is provided by this invention a neutral gyroscope; devices to produce precessing torques to maintain the gyroscope vertical despite the effects of the rotation of the earth and the speed of the gyroscope support on the earth; pendulums to make the gyroscope seek the true vertical; and devices to produce forces on the system of the gyroscope and pendulums to neutralize the forces that the pendulums exert on the gyroscope due to accelerations imposed on the pendulums. These several mechanisms acting simultaneously and in combination provide an accurate vertical-seeking gyroscope that will upon starting up quickly settle on the true vertical and will be so maintained to provide an artificial horizon, a datum for measuring roll and pitch, or to stabilize an object.

It is obvious that various changes may be made by those skilled in the art in the details of the embodiment of the invention illustrated in the drawings and described in detail above within the principle and scope of the invention as expressed in the appended claims.

We claim:

1. In a compensated, vertical-seeking, gyroscopic mechanism, a gyroscope mounted for pivotal movement about horizontally mutually perpendicular axes and means for continuously generating and applying precessional torques to the gyroscope about said axes comprising precessing means acting about each of said mutually perpendicular axes, each of said precessing means being operative to effect a precessional torque to cause the gyroscope to precess about one of its said axes, a component solver for resolving the angular velocity of the earth into components along the said axes of the gyroscope, means for setting one of the elements of the component solver in accordance with the product of the earth's angular velocity and the cosine of the latitude of the gyroscope, means for setting another of the elements of the component solver in accordance with the bearing angle of one of the axes of the gyroscope, means automatically controlled by one of the components of the component solver for effecting the operation of one of said precessing means to apply a precessional torque to the gyroscope proportional to one of the components of said component solver, and means automatically controlled by the other component of the component solver for effecting the operation of the other of said precessing means to apply a precessional torque to the gyroscope proportional to the other component of the component solver.

2. In a gyroscopic mechanism, a gyroscope support, a gyroscope mounted on the support and means for applying precessional torques to the gyroscope in proportion to accelerations comprising an inertia element rotatably mounted on the gyroscope and means for rotating the inertia element at a speed proportional to the speed of movement of the support.

3. In a gyroscopic mechanism, a gyroscope support, a gyroscope mounted on the support for pivotal movement about angularly related axes, and means for applying precessional torques to the gyroscope in proportion to acceleration comprising a synchronous motor responsive to speed of movement of the support mounted on the gyroscope and an inertia element mounted on the shaft of the motor.

4. In a gyroscopic mechanism, a gyroscope support, a gyroscope mounted on the support for pivotal movement about angularly related axes, means for applying precessional forces to the gyroscope including a pendulum carried by the support and operatively connected to the gyroscope, and means for applying precessional torques to the gyroscope to compensate for the effect of accelerations acting on the pendulum comprising a rotatably mounted inertia element mounted on the gyroscope and means reacting upon the pendulum for rotating the inertia element in accordance with the speed of movement of the support.

5. In a gyroscopic mechanism, a gyroscope support, a gyroscope mounted on the support for pivotal movement about angularly related axes, two pendulums mounted upon said support for producing vertical-seeking forces on the gyroscope about said axes, two rotary masses, a motor for rotating each mass, one motor being so mounted that its torque in varying the speed of its rotating mass is operative to counteract the effect of accelerations on one of the pendulums and the other motor being so mounted that its torque in varying the speed of its rotating mass is operative to counteract the effect of accelerations on the other pendulum, means responsive to the movement of the support about one of said angularly related axes relative to a horizontal plane to control the speed of one of the motors, and means responsive to the movement of the support about the other of said axes relative to a horizontal plane to control the speed of the other motor.

6. In a gyroscopic mechanism, a gyroscope support mounted upon a movable platform, a gyroscope mounted on the support for movement about two mutually perpendicular axes, pendulous means for applying precessional forces to the gyroscope about each of said mutually perpendicular axes, and means for applying compensating precessional torques to the gyroscope to offset the effect of movements of the platform on the pendulums including two inertia elements rotatably mounted on the gyroscope, one for each of said mutually perpendicular axes, means for resolving the movements of the platform into components along said mutually perpendicular axes of the gyroscope and means automatically controlled by the component solver for rotating said inertia elements in accordance with such components of movement of the platform.

7. In a compensated, vertical-seeking, gyroscopic mechanism, a gyroscope mounted for movement about mutually perpendicular axes and means for continuously generating and applying precessional torques to the gyroscope comprising precessing means for each of said mutually perpendicular axes, each of said precessing means including a movably mounted mass and a repeater motor mounted on the gyroscope, a component solver having two settable elements for resolving the angular velocity of the earth into components along the axes of the gyroscope, means for setting one of the elements of the component solver in accordance with the product of the earth's angular velocity and the cosine of the latitude of the gyroscope, means for setting another of the elements of the component solver in accordance with the bearing angle of one of the axes of the gyroscope, a transmitter operated by one of the components of the component solver and connected to one of said repeater motors, and another transmitter operated by the other components of the component solver and connected to the other repeater motor.

8. In a compensated, vertical-seeking, gyroscopic mechanism for establishing a horizontal plane on a moving ship, a gyroscope support mounted on the ship for movement in bearing with respect thereto, a gyroscope mounted on the gyroscope support for movement about mutually perpendicular axes, means for generating and applying precessional torques to the gyroscope to compensate for movement of the ship over the surface of the earth comprising means for resolving the speed of the ship into components along the mutually perpendicular axes of the gyroscope, and means automatically controlled by the output elements of said resolving means operable in proportion to the components of the speed of the ship for applying precessional torques proportional to said components of the ship's speed to said gyroscope about said mutually perpendicular axes.

9. In a compensated, vertical-seeking, gyroscopic mechanism, for establishing a horizontal plane on a moving ship, a gyroscope support mounted on the ship for movement in bearing with respect thereto, a gyroscope mounted on the gyroscope support for movement about mutually perpendicular axes and means for generating and applying precessional torques to the gyroscope including precessing means for each of said mutually perpendicular axes, each of said precessing means being operative to apply a precessional force to cause the gyroscope to precess about one of its axes, a component solver for resolving the speed of the ship into components along the axes of the gyroscope, means automatically controlled by one element of said solver adjusted in proportion to one of the components of the ship's speed for effecting the operation of one of said precessing means to apply a precessional torque to the gyroscope, and means automatically controlled by the other element of said solver adjusted in proportion to the other of the components of the ship's speed for effecting the operation of the other precessing means to apply a precesional torque to the gyroscope.

10. In a compensated, vertical-seeking, gyroscopic mechanism for establishing a horizontal plane on a moving ship, a gyroscope support mounted on the ship for movement in bearing with respect thereto, a gyroscope mounted on the gyroscope support for movement about mutually perpendicular axes and means for generating and applying precessional torques to the gyroscope comprising precessing means for each of said mutually perpendicular axes, each of said precessing means being operative to apply a precessional torque to cause the gyroscope to precess about one of its axes, a component solver having a plurality of settable elements for resolving the speed of the ship into components along the axes of the gyroscope, means for setting one of the elements of the component solver in accordance with the speed of the ship, means for setting the other element of the component solver in accordance with the bearing angle of one axis of the gyroscope relative to the bearing angle of the ship, automatic means controlled by one element of said solver adjusted in proportion to one of the components of the ship's speed for effecting the operation of one of said precessing means to apply a precessional torque to the gyroscope, and automatic means controlled by the other element of said solver adjusted in proportion to the other of the components of the ship's speed for effecting the operation of the other of said precessing means to apply a torque to the gyroscope.

11. In a compensated, vertical-seeking, gyroscopic mechanism for establishing a horizontal plane on a moving ship, a gyroscope mounted on the ship for pivotal movement about two mutually perpendicular axes and means for continuously generating and applying precessional torques to the gyroscope comprising means for resolving the angular velocity of the earth's rotation into components along the respective axes of the gyroscope, means for resolving the velocity of the ship into components along the respective axes of the gyroscope, separate means for algebraically combining the corresponding components of the angular velocity of the earth's rotation and the velocity of the ship to the gyroscope about said mutually perpendicular axes, means automatically controlled by one of the combining means to apply a precessional torque about one of said axes, and means automatically controlled by the other of said combining means to apply a precessional torque about the other of said axes.

12. In a compensated, vertical-seeking, gyroscopic mechanism for establishing a horizontal plane on a moving ship, a gyroscope mounted for precessional movement about two mutually perpendicular axes and means for continuously generating and applying precessional torques to the gyroscope comprising precessing means operative to apply a precessional torque to cause the gyroscope to precess about one of its axes, means for resolving the angular velocity of the earth's rotation into respective components along the said axes of the gyroscope, means for resolving the velocity of the ship into respective components along the said axes of the gyroscope, means for algebraically adding the component of the angular velocity of the earth along one axis of the gyroscope to the component of the ship's velocity along the same axis, and means automatically controlled by said adding means for effecting the operation of said precessing means to apply a precessing force to the gyroscope proportional to the sum of said components.

13. In a compensated, vertical-seeking, gyroscopic mechanism for a ship, a gyroscope mounted for precessional movement about two mutually perpendicular axes, and means for generating and applying precessional torques to the gyroscope to compensate for accelerations due to movement of the ship comprising precessing means for each of said mutually perpendicular axes, each precessing means including an inertia element rotatably mounted on the gyroscope and means operative to rotate the inertia element, means for producing a movement proportional to the movement of the ship at the gyroscope, means for resolving said movement into components along the axes of the gyroscope, means automatically controlled by one element of said resolving means adjusted in proportion to one of the components of said movement for effecting the operation of one of said inertia element rotating means, and means automatically controlled by the other element of said resolving means adjusted in proportion to the other of the components of said movement for effecting the operation of the other inertia element rotating means.

14. In a compensated, vertical-seeking, gyroscopic mechanism for a ship, a gyroscope support, a gyroscope mounted on the support for precessional movement about mutually perpendicular axes, a pendulum for applying a vertical-seeking precessional force on the gyroscope about each of said mutually perpendicular axes, and means for continuously generating and applying precessional torques to the gyroscope to compensate for the effect on the pendulums of accelerations due to movement of the ship comprising means for producing a movement proportional to the movement of the ship at the gyroscope, means for resolving said movement into components along the said axes of the gyroscope, means automatically controlled by the output elements of said resolving means operable in proportion to the components of said movement for exerting precessional torques about the axes of the gyroscope proportional to accelerations of the movements along such components, and means for continuously generating and applying precessional torques to the gyroscope to compensate for the movement of the ship and the rotation of the earth comprising means for resolving the angular velocity of the rotation of the earth into components along the said axes of the gyroscope, means for resolving the velocity of the ship into components along the said axes of the gyroscope, separate means for algebraically combining the corresponding components of the angular velocity of the earth's rotation and the velocity of the ship about said mutually perpendicular axes, means automatically controlled by one of the combining means to impart a precessional torque about one of said axes, and means automatically controlled by the other of said combining means to impart a precessional torque about the other of said axes.

EDWARD J. POITRAS.
JAMES D. TEAR.

REFERENCES CITED

The following references are of record in the file of this patent:

UNITED STATES PATENTS

| Number | Name | Date |
|---|---|---|
| 1,450,585 | Ford | Apr. 3, 1923 |
| 1,628,136 | Ford | May 10, 1927 |
| 1,834,692 | Farmer et al. | Dec. 1, 1921 |
| 1,932,210 | Glitscher | Oct. 24, 1933 |
| 1,801,619 | Arrea | Apr. 21, 1931 |

FOREIGN PATENTS

| Number | Country | Date |
|---|---|---|
| 4,891 | Great Britain | Feb. 25, 1914 |